United States Patent
Wagner et al.

(10) Patent No.: US 8,315,772 B2
(45) Date of Patent: Nov. 20, 2012

(54) METHOD AND APPARATUS FOR ENABLING A BRAKING ASSISTANT FUNCTION IN A MOTOR VEHICLE

(75) Inventors: Jochen Wagner, Moeglingen (DE); Stefan Epple, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 1245 days.

(21) Appl. No.: 11/665,397

(22) PCT Filed: Aug. 16, 2005

(86) PCT No.: PCT/EP2005/054012
§ 371 (c)(1),
(2), (4) Date: Apr. 24, 2008

(87) PCT Pub. No.: WO2006/040209
PCT Pub. Date: Apr. 20, 2006

(65) Prior Publication Data
US 2009/0182477 A1    Jul. 16, 2009

(30) Foreign Application Priority Data

Oct. 14, 2004 (DE) .......................... 10 2004 050 059

(51) Int. Cl.
*B60T 7/12* (2006.01)
*G05D 1/00* (2006.01)
*G06F 7/00* (2006.01)
*G06F 17/00* (2006.01)

(52) U.S. Cl. ............... 701/78; 701/70; 701/83; 477/182; 477/183; 477/184

(58) Field of Classification Search ..................... 701/70, 701/78, 83; 477/182, 183, 184; 303/125, 303/155, 157, 158, 159
See application file for complete search history.

(56) References Cited

U.S. PATENT DOCUMENTS

| | | | |
|---|---|---|---|
| 5,967,628 A * | 10/1999 | Abe et al. ................. | 303/122.12 |
| 6,129,423 A | 10/2000 | Hashimoto | |
| 6,145,939 A | 11/2000 | Chang et al. | |
| 6,189,986 B1 * | 2/2001 | Shimizu et al. ............... | 303/155 |
| 6,220,675 B1 * | 4/2001 | Steffes ........................ | 303/116.2 |
| 6,227,629 B1 * | 5/2001 | Yoshida et al. ............... | 303/155 |
| 6,238,019 B1 * | 5/2001 | Okazaki et al. ............... | 303/146 |
| 6,328,389 B1 * | 12/2001 | Yotsuya et al. ............. | 303/113.3 |
| 6,460,942 B1 * | 10/2002 | Shimizu et al. ............... | 303/125 |
| 6,637,839 B1 | 10/2003 | Fuchs et al. | |
| 6,666,530 B2 * | 12/2003 | Mizutani et al. ........... | 303/114.3 |
| 6,923,511 B2 * | 8/2005 | Hara et al. .................... | 303/155 |
| 7,070,248 B2 * | 7/2006 | Hara et al. .................... | 303/155 |
| 7,188,914 B1 * | 3/2007 | Hecker et al. ................. | 303/157 |
| 7,250,850 B2 * | 7/2007 | Mizutani ...................... | 340/435 |

(Continued)

FOREIGN PATENT DOCUMENTS
DE          197 39 152       3/1999

(Continued)

*Primary Examiner* — Khoi Tran
*Assistant Examiner* — Jamie Figueroa
(74) *Attorney, Agent, or Firm* — Kenyon & Kenyon LLP

(57) ABSTRACT

A method for shifting the braking assistant function into an activatable state, in which method:
  after termination of a braking force monitoring function, the braking assistant function is shifted into a non-activatable state or a non-activatable state is maintained;
  information about the hydraulic pressure at a predefined point in the hydraulic braking circuit is determined; and
  after at least one predefined condition is met by that information, the braking assistant function is shifted into an activatable state.

8 Claims, 3 Drawing Sheets

U.S. PATENT DOCUMENTS

| | | | |
|---|---|---|---|
| 2001/0004833 A1* | 6/2001 | Schluter et al. | 60/533 |
| 2002/0130550 A1 | 9/2002 | Roden et al. | |
| 2004/0183373 A1* | 9/2004 | Yonemura et al. | 303/191 |
| 2004/0212251 A1* | 10/2004 | Kinder et al. | 303/191 |
| 2005/0151416 A1* | 7/2005 | Feigel | 303/11 |
| 2006/0195231 A1* | 8/2006 | Diebold et al. | 701/1 |

FOREIGN PATENT DOCUMENTS

| | | |
|---|---|---|
| DE | 198 41 879 | 8/1999 |
| JP | 9-290743 | 11/1997 |

* cited by examiner

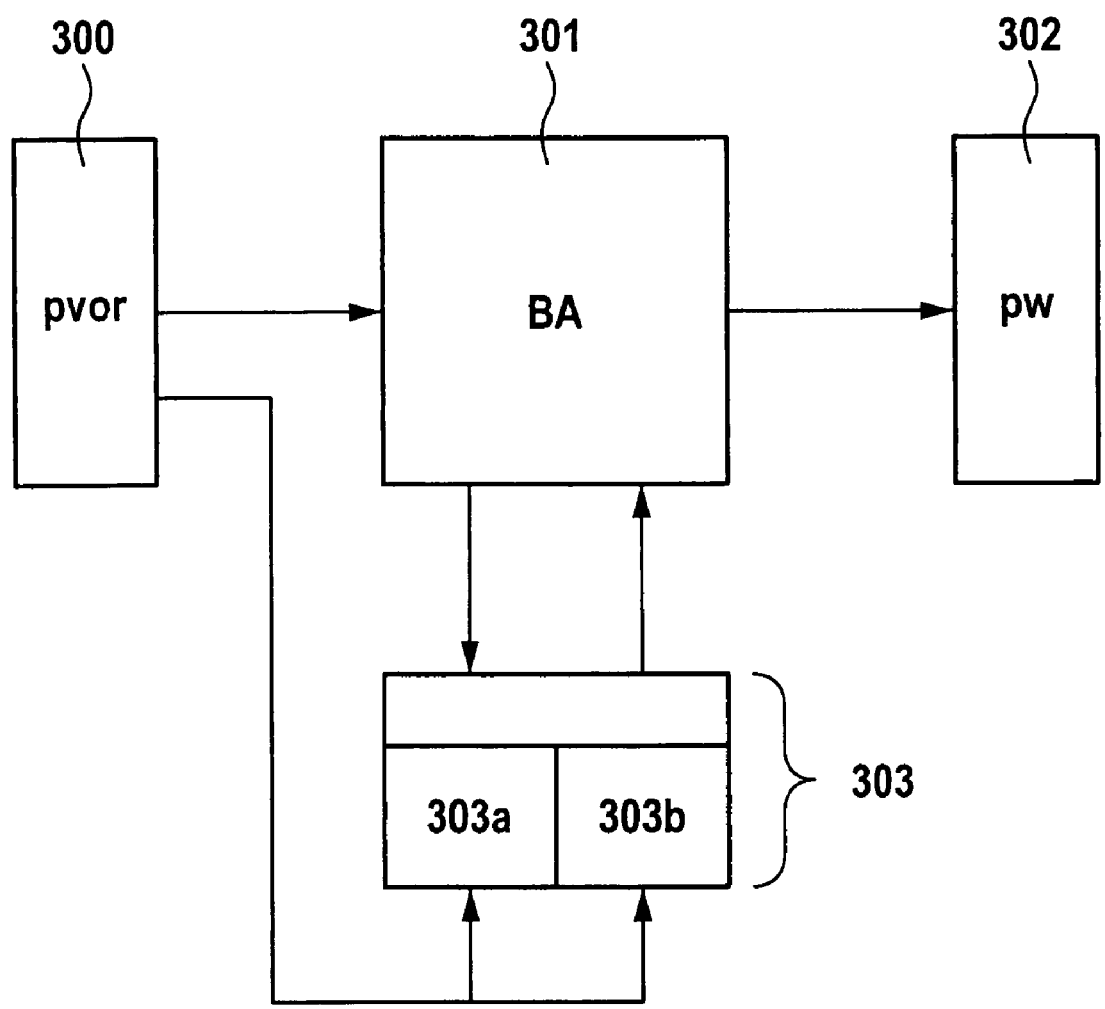

METHOD AND APPARATUS FOR ENABLING A BRAKING ASSISTANT FUNCTION IN A MOTOR VEHICLE

FIELD OF THE INVENTION

The present invention relates to a method and an apparatus for shifting the braking assistant function into an activatable state.

BACKGROUND INFORMATION

German Patent Application No. DE 197 39 152 describes a method and an apparatus for controlling the braking system of a vehicle, in which context an actuation signal is sensed and an automatic braking operation is triggered when that actuation signal exceeds a predefined threshold value. That threshold value depends on the braking phase that currently exists.

SUMMARY OF THE INVENTION

The present invention relates to a method for shifting the braking assistant function into an activatable state, in which method:
after termination of a braking force monitoring function, the braking assistant function is shifted into a non-activatable state or a non-activatable state is maintained;
information about the hydraulic pressure at a predefined point in the hydraulic braking circuit is determined; and
after at least one predefined condition is met by that information, the braking assistant function is shifted into an activatable state.

On the basis of information about the hydraulic pressure, a decay of hydraulic oscillations in the braking circuit after shutoff of a braking force monitoring function can be detected.

An advantageous embodiment of the present invention is characterized in that
after termination of a braking force monitoring function, the braking assistant function is shifted into a non-activatable state or a non-activatable state is maintained; and
then, at various determination times, information about the hydraulic pressure at a predefined point in the hydraulic braking circuit is determined.

This advantageous embodiment can also be expressed as the fact that subsequent to termination of the braking force monitoring function and subsequent to shifting of the braking assistant function into a non-activatable state or maintenance of a non-activatable state of the braking assistant function, information about the hydraulic pressure at a predefined point in the hydraulic braking circuit is determined at various determination times.

An advantageous embodiment of the present invention is characterized in that the braking force monitoring function is a braking assistant function. This ensures that upon shutoff of an active braking assistant intervention, the pressure oscillations which then often occur in the braking circuit do not result in a reactivation of the braking assistant.

An advantageous embodiment of the present invention is characterized in that the hydraulic pressure at a predefined point in the braking circuit is the inlet pressure at the output of the brake master cylinder. The inlet pressure is usually sensed in braking regulation systems by way of a sensor. When this sensor is also used, the present invention can be put to use without additional sensors and thus in very economical fashion.

An advantageous embodiment of the present invention is characterized in that the information is determined at regular determination times.

An advantageous embodiment of the present invention is characterized in that the information is the change in the pressure value over a time interval of predefined length.

An advantageous embodiment of the present invention is characterized in that as the predefined condition, the change in the pressure per time interval always falls below a predefined limit value during a predefined number of successive determination times.

Decaying of the oscillation can thereby be identified. The predefined limit value can be, in three different embodiments, a negative value or the value zero or a small positive value.

An advantageous embodiment of the present invention is characterized in that as the predefined condition, the change in the pressure per time interval falls below a predefined limit value at a predefined number of determination times.

This embodiment exploits the fact that the pressure oscillations occurring after shutoff of the braking assistant are very short-lived and last for only a few periods. Here as well, in three different embodiments the predefined limit value can be a negative value or the value zero or a small positive value. Selection of a small positive limit value, in the region of approximately 0.3 to 0.5 bar, takes into account the fact that the pressure cannot be determined exactly, so a permissible small positive value is therefore to be considered in the context of a tolerance band.

An advantageous embodiment of the present invention is characterized in that the braking force monitoring function is terminated when the quotient of the pressure in a wheel brake cylinder divided by the inlet pressure falls below a predefined limit value, the limit value being greater than or equal to 1. The wheel brake cylinder exhibiting the greatest pressure is especially to be considered in this context. The pressure in the wheel brake cylinders can be determined by way of sensors, or by an estimate or calculation based on a mathematical model. It is of course conceivable and possible, in addition to the aforesaid criterion for termination of the braking force monitoring function, for further additional criteria also to exist.

The present invention further encompasses an apparatus for shifting the braking assistant function into an activatable state, which apparatus contains
braking assistant inhibiting means with which the braking assistant function, after termination of a braking monitoring function, is shifted into a non-activatable state or a non-activatable state is maintained;
determination means with which subsequently, at various determination times, information about the hydraulic pressure at a predefined point in the hydraulic braking circuit is determined; and
braking assistant readiness means with which, after at least one predefined condition is met by the information determined in the determination means, the braking assistant function is shifted into an activatable state.

The advantageous embodiments of the method according to the present invention are of course also expressed as advantageous embodiments of the apparatus according to the present invention, and vice versa.

BRIEF DESCRIPTION OF THE DRAWINGS

FIG. 3 shows the schematic configuration of the apparatus according to the present invention.

DETAILED DESCRIPTION

Figure 1:
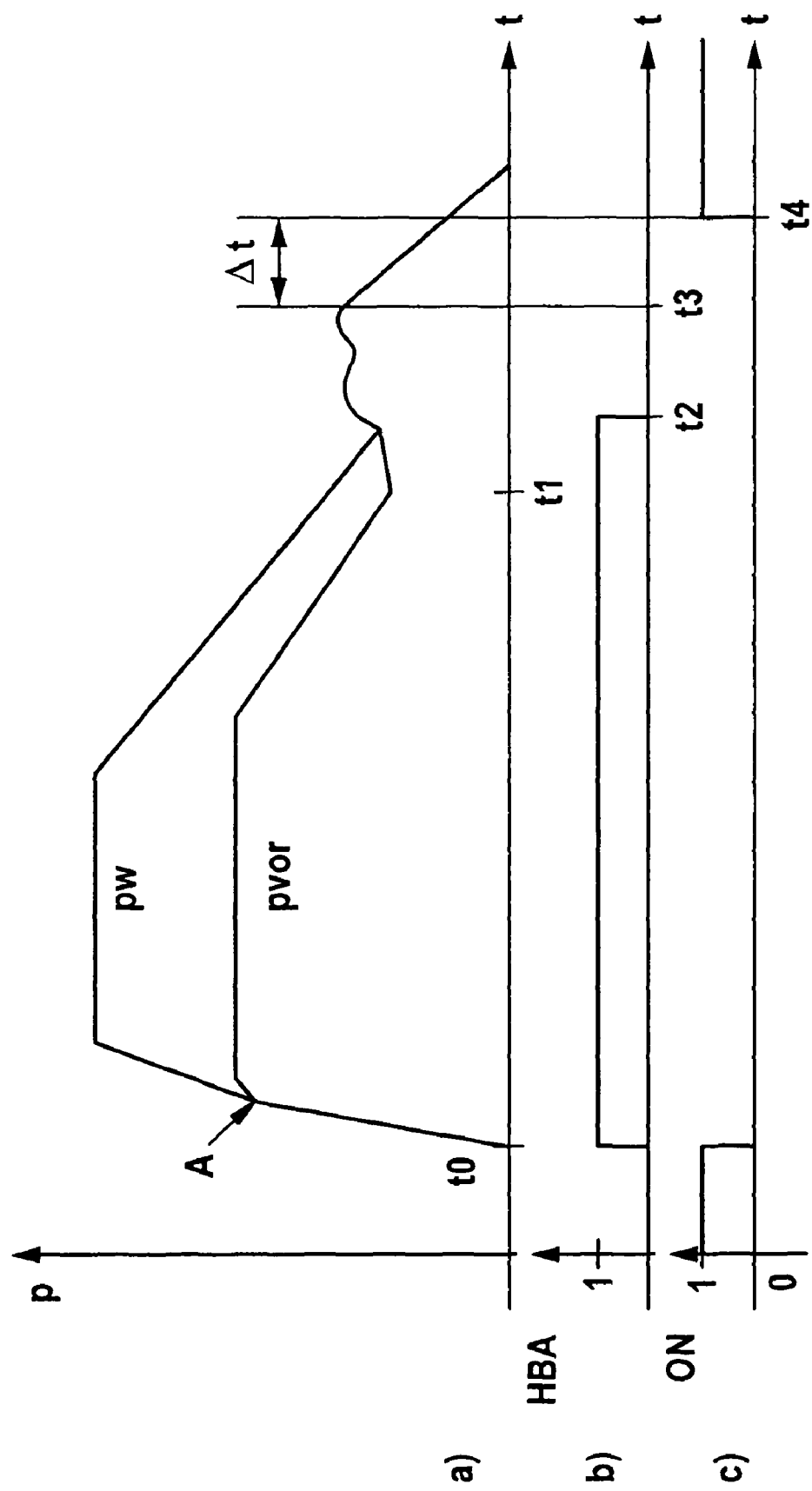
FIG. 1 shows the changes over time in various variables.

After termination of an active or partly active braking intervention, and after braking pressure dissipation subsequent thereto in the wheel brake cylinders, pressure fluctuations can occur in the braking circuit during and immediately after the pressure dissipation phase. These pressure fluctuations are sensed by the inlet pressure sensor at the outlet of the main cylinder, and if they are of sufficiently high intensity, can be falsely interpreted as a driver-initiated triggering of the braking assistant. An unintentional and unjustified triggering of the braking assistant would thus occur.

An active or partly active braking intervention is carried out, for example, by the following vehicle functions:
- the vehicle dynamics control system (active and partly active braking intervention possible);
- the automatic slip control system (active and partly active braking intervention possible);
- the hill-holder function (active and partly active braking intervention possible);
- the hill descent control (HDC) function, which establishes a constant travel speed when the vehicle is driving down a hill (active braking intervention only);
- the hydraulic fade compensation (HFC) function, which increases brake pressure independently of the driver when the brake discs are hot, in order to compensate for brake fade (decrease in braking action) (partly active braking intervention only);
- the braking assistant function (partly active braking intervention only);
- the hydraulic full deceleration (HFD) function (partly active braking intervention only).

The HFD function acts only the rear-axle wheels and is activated if the front-axle wheels are under ABS control but the rear-axle wheels are not.

While these interventions are being carried out, activation of the braking assistant function is inhibited or the sensitivity of the braking assistant function is decreased. According to the present invention, the braking assistant function is not enabled again, or switched back to its higher sensitivity, until
- the active or partly active braking intervention is terminated; and
- the change over time in the inlet pressure subsequent thereto meets predefinable conditions.

This ensures that the inlet pressure modulation possibly generated by the active braking intervention shutoff event, i.e. the pressure fluctuations visible at the inlet-pressure sensor, do not result in improper activation of the braking assistant.

In an embodiment, the braking assistant is not enabled until the change in the inlet pressure is less than or equal to a threshold value for a predefinable number of, in particular, successive cycles after shutoff of the preceding active braking intervention. The inlet pressure, and also its change over time, are determined once in each cycle. A cycle encompasses a duration of, for example, 20 milliseconds, i.e. the inlet pressure and its change over time are determined every 20 ms. A change over time of, for example, 0.5 bar/20 ms has proven to be suitable as a threshold value. The predefined number of cycles can be, for example, ten. In this quantitative example, therefore, the change in the inlet pressure is determined every 20 ms. If an increase of at most 0.5 bar, or even a decrease, in the inlet pressure is present ten times in succession, the braking assistant is then re-enabled and can be activated again by the driver via the brake pedal.

In an embodiment of the present invention, it is also possible to dispense with the requirement that the cycles having an associated negative sign for the change in inlet pressure must immediately follow one another.

The changes over time in various variables are plotted in FIG. 1, time t being plotted on the abscissa in each case. Plotted in the ordinate direction is
- in the upper diagram a), pressure p;
- in the middle diagram b), the status HBA of the hydraulic braking assistant (HBA=0: braking assistant not activated; HBA=1: braking assistant activated); and
- in the lower diagram c), the status ON of hydraulic braking assistant enabling (ON=0: braking assistant not activatable or enabled; ON=1: braking assistant activatable or enabled).

The pressure pw in a wheel brake cylinder and the pressure pvor are plotted in the upper diagram. Beginning at a time t2, pw and pvor decrease together, i.e. pw=pvor. Only a single curve is therefore visible in this diagram for t>t2.

Until time t0 an unbraked driving state exists, and the braking assistant is ready for activation, i.e. the braking assistant is enabled and can be activated at any time. This is recognizable from the fact that in diagram c), the status ON assumes a value of 1, but according to diagram b) the braking assistant is not yet activated. At the same time, as shown by diagram a), neither an inlet pressure nor a braking pressure in the wheel brake cylinder exist.

At time t0, a braking event is initiated by the driver. This is evident in diagram a) from the rise in the inlet pressure pvor and the wheel brake cylinder pressure pw. The pressure rise occurs sufficiently quickly (i.e. the driver actuates the brake sufficiently vigorously or quickly) that the braking assistant is activated. Superimposed on the braking pressure generated by the driver (measurable by pvor) is a braking pressure generated independently of the driver, so that after the point in time labeled A, the wheel brake cylinder pressure pw is greater than the inlet pressure pvor. At time t0 the status HBA therefore changes to a value 1, and the status ON to a value of 0.

The driver maintains the inlet pressure pvor for a period of time, then decreases the inlet pressure until slowly raising it again at time t1. In the meantime, the wheel brake cylinder pressure has also decreased again, and at time t2 has reached the value of the inlet pressure, or the quotient of the pressure in a wheel brake cylinder divided by the inlet pressure has fallen below a predefined limit value, the limit value being greater than or equal to 1. The braking assistant is therefore switched off at time t2.

As a result of the deactivation of the braking assistant and the switching, associated therewith, of valves in the braking circuit (in particular the switchover valve), oscillations occur in the brake pressure curve starting at time t2; if their slope is sufficient, these oscillations can result in another triggering of the braking assistant. Starting at time t2, the change in the inlet pressure per time interval is regularly determined; this can occur, for example, every 20 milliseconds. If a sufficiently steep decay in the inlet pressure is identified continuously over a specific number of cycles (e.g. ten cycles), the oscillations have then definitely decayed and the braking assistant can once again be enabled, i.e. shifted into an activatable state. In the time interval labeled $\Delta t$, between t3 and t4, this condition is met, i.e. during this interval a sufficiently steep decrease in braking pressure is identified at every "sample" (i.e. in each determination cycle). In the quantitative example, $\Delta t$ encompasses ten cycles or determination cycles. At time t4 the braking assistant is therefore shifted once again into an activation-ready state, i.e. the value of ON changes to 1.

Be it noted that the pressure drop prior to time t1 can also occur substantially more steeply than plotted in FIG. 1. This can result in even more severe oscillations that those depicted in FIG. 1.

Figure 2:
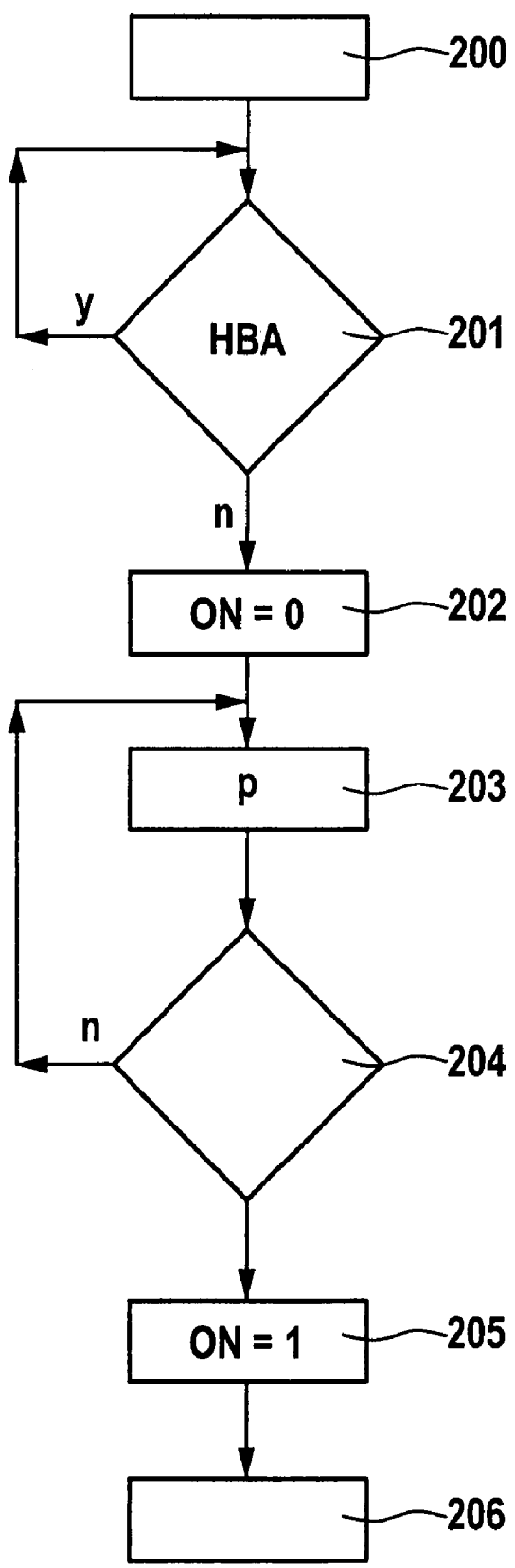
FIG. 2 shows the execution principle of the method according to the present invention.

Execution of the method according to the present invention is depicted in FIG. 2. After the method starts in block 200, block 201 queries whether the braking assistant function labeled HBA (which can also be a braking force monitoring function in general) is still ongoing. If the response is Yes (labeled "y" in FIG. 2), execution branches back to the input to block 201. If the response, however, is No (labeled "n" in FIG. 2), then in block 202 the status ON of hydraulic braking assistant enabling (ON=0: braking assistant not activatable or enabled; ON=1: braking assistant activatable or enabled) is set to zero. If the status ON=0 already existed, that status is then maintained. In block 203, information is then determined as to the hydraulic pressure p at a predefined point in the braking circuit. Block 204 then queries whether a predefined condition is met by that information. If the response is Yes, then in block 205 the enabling status of the braking assistant is set to ON=1. If the response is No, execution then branches back to block 203, where information about the hydraulic pressure p at a predefined point in the braking circuit is determined at the next determination time. Following block 205, the method ends at block 206.

The configuration of an embodiment of the apparatus according to the present invention is depicted in FIG. 3. Block 300 contains determination means (e.g. an inlet pressure sensor) whose output signals are delivered to braking assistant 301. Braking assistant 301 in turn controls wheel brakes 302. Block 301 interacts with block 303, which controls the status of the activation readiness of the braking assistant. Block 303 contains braking assistant inhibiting means 303a with which braking assistant function 301, after termination of a braking force monitoring function, is shifted into a non-activatable state or a non-activatable state is maintained, and braking assistant readiness means 303b with which, after at least one predefined condition has been met by the information determined in determination means (300) (which can be the inlet pressure sensor), the braking assistant function is shifted into an activatable state.

Blocks 303a and 303b receive input signals from block 300.

What is claimed is:

1. A method for shifting a braking assistant enabling function into an activatable state, the method comprising:
    after a termination of a braking assistant function, one of shifting the braking assistant enabling function, which enables re-triggering of the braking assistant function, into a non-activatable state and maintaining a non-activatable state;
    while the braking assistant enabling function is in the non-activatable state after the termination of the braking assistant function, determining, at various determination times, information about a hydraulic pressure at a predefined point in a hydraulic braking circuit; and
    after at least one predefined condition is met by the information, shifting the braking assistant enabling function into an activatable state;
    wherein the at least one predefined condition includes a magnitude of a slope of a decrease in the hydraulic pressure over time being greater than a predefined threshold steepness for a predefined number of determination times.

2. The method according to claim 1, wherein the pressure at a predefined point in the braking circuit is an inlet pressure at an output of a brake master cylinder.

3. The method according to claim 1, wherein the information is determined at regular determination times.

4. The method according to claim 1, wherein the slope is measured over time intervals having a predefined length.

5. The method according to claim 4, wherein the predefined condition is only satisfied if the magnitude of the slope is greater than the threshold steepness for each of the predefined number of determination times, which are successive.

6. The method according to claim 2, wherein the braking assistant function is terminated when a quotient of a pressure in a wheel brake cylinder divided by an inlet pressure falls below a predefined limit value, the limit value being greater than or equal to 1.

7. The method according to claim 6, wherein the wheel brake cylinder is a wheel brake cylinder exhibiting a greatest estimated pressure.

8. An apparatus for shifting a braking assistant enabling function into an activatable state, comprising:
    a braking assistant inhibiting arrangement for one of shifting the braking assistant enabling function, which enables re-triggering of a braking assistant function, after termination of the braking assistant function, into a non-activatable state, and maintaining a non-activatable state;
    a determination arrangement for determining subsequently, at various determination times, information about a hydraulic pressure at a predefined point in a hydraulic braking circuit; and
    a braking assistant readiness arrangement for shifting, after at least one predefined condition is met by the information determined in the determination arrangement, the braking assistant enabling function into an activatable state;
    wherein the at least one predefined condition includes a magnitude of a slope of a decrease in the hydraulic pressure over time being greater than a predefined threshold steepness for a predefined number of determination times.

* * * * *